US011519460B2

(12) United States Patent
Falossi et al.

(10) Patent No.: US 11,519,460 B2
(45) Date of Patent: Dec. 6, 2022

(54) WHEEL HUB BEARING MODULE FOR A SUSPENSION UPRIGHT OR KNUCKLE

(71) Applicants: Aktiebolaget SKF, Gothenburg (SE); SKF Aerospace France S.A.S, Montigny-le-Bretonneux (FR)

(72) Inventors: Marco Falossi, San Raffaele Cimena (IT); Valentin Fleury, Romans-sur-Isère (FR); Alessandro Garrone, Utrecht (NL); Remi Sarlin, Allex (FR); Edo Schramm, The Hague (NL)

(73) Assignees: SKF AEROSPACE FRANCE; AKTIEBOLAGET SKF

( * ) Notice: Subject to any disclaimer, the term of this patent is extended or adjusted under 35 U.S.C. 154(b) by 776 days.

(21) Appl. No.: 16/508,685

(22) Filed: Jul. 11, 2019

(65) Prior Publication Data
US 2020/0047795 A1 Feb. 13, 2020

(30) Foreign Application Priority Data

Aug. 8, 2018 (IT) .......................... 102018000007973

(51) Int. Cl.
*F16C 35/077* (2006.01)
*F16C 33/58* (2006.01)
*B60B 27/00* (2006.01)

(52) U.S. Cl.
CPC ........ *F16C 35/077* (2013.01); *B60B 27/0078* (2013.01); *B60B 27/0094* (2013.01);
(Continued)

(58) Field of Classification Search
CPC .......... F16C 19/18–187; F16C 2326/02; F16C 35/077; F16C 33/64; F16C 33/581;
(Continued)

(56) References Cited

U.S. PATENT DOCUMENTS 6,715,925 B2 * 4/2004 Pairone ................. F16C 35/063
 384/537
6,860,639 B2 * 3/2005 Tabuchi ................ F16C 35/067
 384/537
(Continued)

FOREIGN PATENT DOCUMENTS

DE  102016217365  3/2018
JP  2015055307  3/2015
(Continued)

OTHER PUBLICATIONS

Machine Translation of JP-2015055307-A (Year: 2015).*
International Search Report for Italy Patent Application No. 102018000007973 dated Mar. 13, 2019.

Primary Examiner — Alan B Waits
(74) Attorney, Agent, or Firm — Reed Smith LLP

(57) ABSTRACT

A hub bearing module for a lightweight suspension upright or knuckle of a vehicle, the hub bearing module including a wheel bearing and a bearing connection interface to the suspension upright or knuckle, the bearing connection interface being arranged coaxial with the rolling bearing and including a first sleeve element and a second sleeve element arranged radially outside the first sleeve element and including a composite, preferably BMC (Bulk Molding Compound) annular body having a radially inner lateral surface mechanically coupled to the first sleeve element and a radially outer lateral surface configured to mechanically and chemically couple with the suspension upright or knuckle.

12 Claims, 3 Drawing Sheets

(52) U.S. Cl.
CPC ....... *F16C 33/581* (2013.01); *B60B 2900/111* (2013.01); *F16C 2208/02* (2013.01); *F16C 2326/02* (2013.01)

(58) Field of Classification Search
CPC ................ F16C 33/586; F16C 2220/06; F16C 2208/02; F16C 2208/04; B60B 2310/321; B60B 2310/323; B60B 2360/34–3418; B60B 2900/111; B60B 27/0078; B60B 27/0094; B60B 2380/44; B60B 2380/90
See application file for complete search history.

(56) References Cited

U.S. PATENT DOCUMENTS

| | | | |
|---|---|---|---|
| 9,086,095 B2* | 7/2015 | Vissers | F16C 33/64 |
| 9,273,772 B2* | 3/2016 | Ichikawa | F16C 33/586 |
| 2016/0121927 A1* | 5/2016 | Schaake | B60B 27/0094 |
| | | | 280/93.512 |
| 2019/0032709 A1* | 1/2019 | Newcomb | B32B 5/26 |

FOREIGN PATENT DOCUMENTS

| | | | |
|---|---|---|---|
| JP | 2015055307 A | * | 3/2015 |
| JP | 2016156394 | | 9/2016 |
| JP | 2016196946 | | 11/2016 |

\* cited by examiner

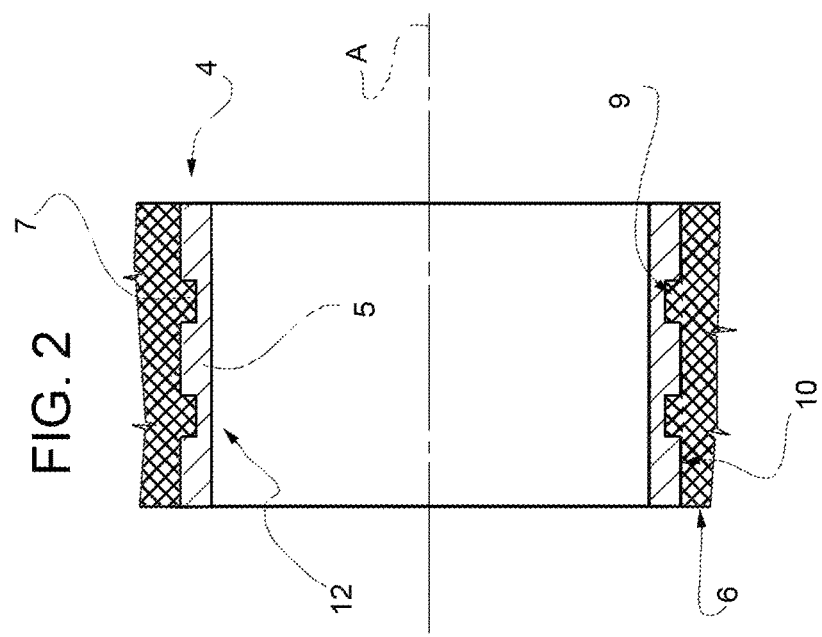
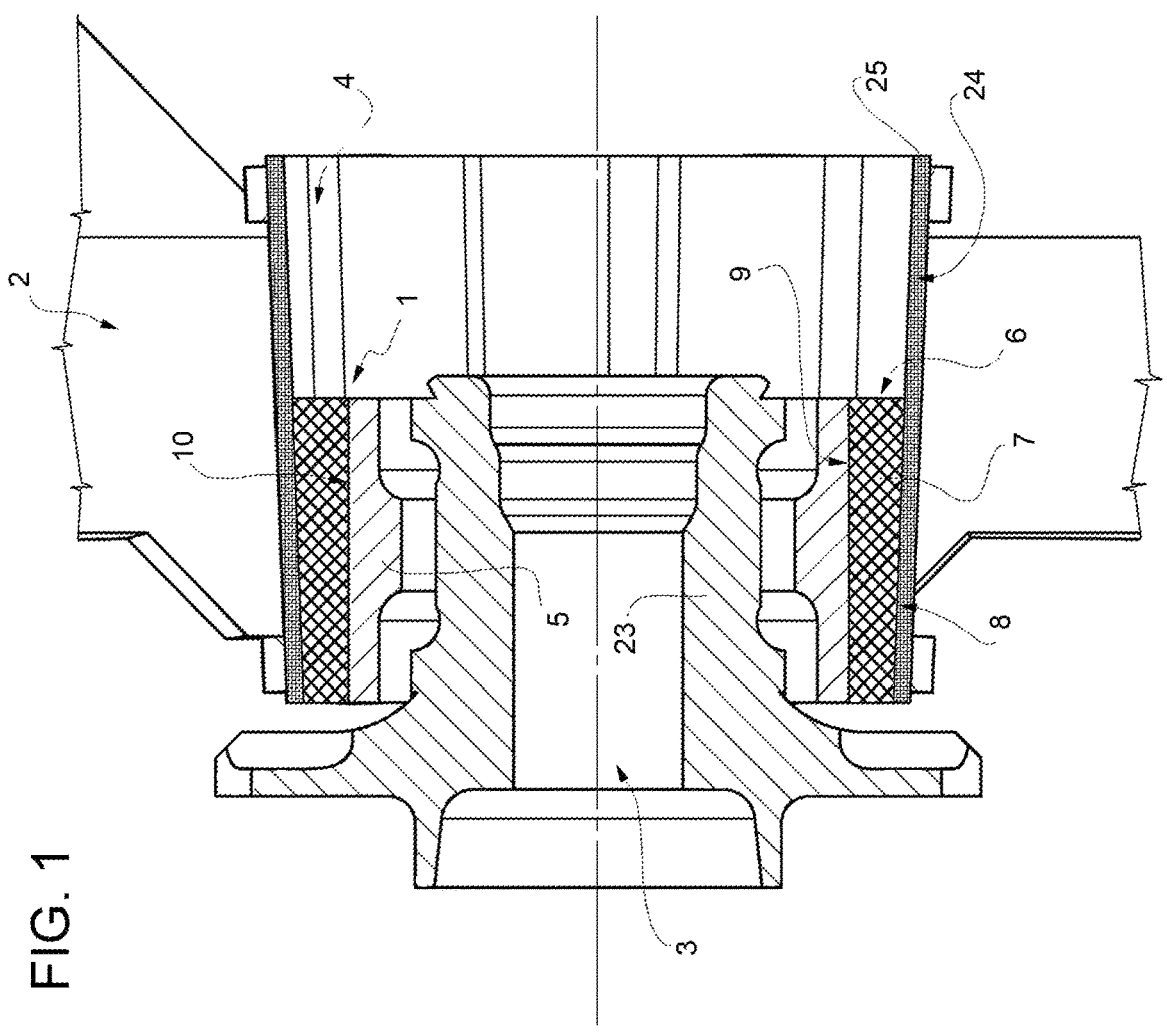

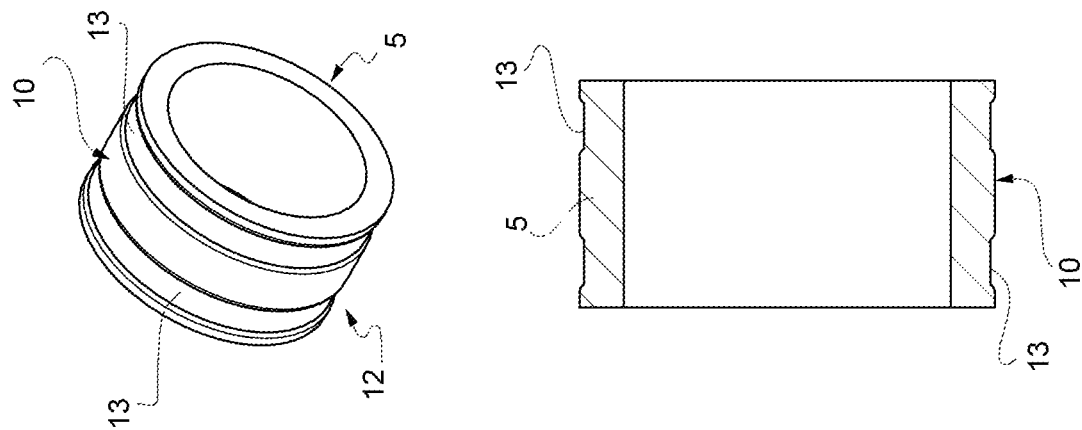
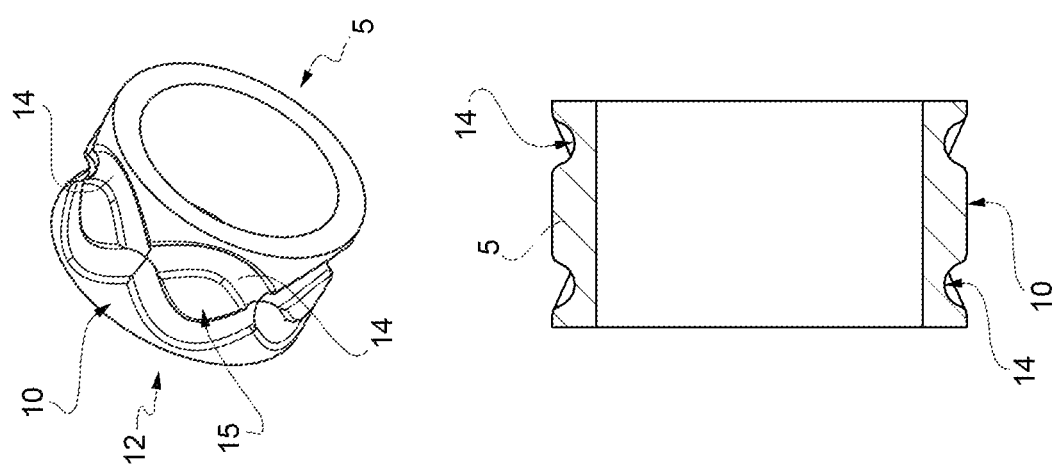
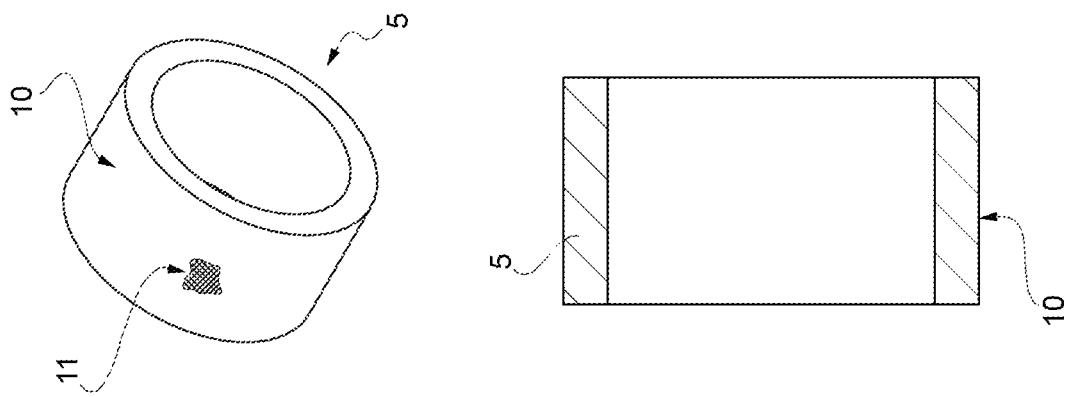

WHEEL HUB BEARING MODULE FOR A SUSPENSION UPRIGHT OR KNUCKLE

CROSS-REFERENCE TO RELATED APPLICATIONS

This application claims priority to Italian patent application no. 102018000007973 filed on Aug. 8, 2018, the contents of which are fully incorporated herein by reference.

FIELD OF THE INVENTION

The present invention concerns a wheel hub bearing module for a suspension upright or knuckle, in particular a steering knuckle, of a vehicle.

BACKGROUND OF THE INVENTION

As it is known, e.g. from US2016121927A1, in the interests of fuel economy there is an increasing drive within the automotive industry towards weight reduction of the component parts of vehicles. One such component is the steering knuckle, which connects the wheel bearing to the vehicle suspension and, more in general, such components include all the uprights of the vehicle suspension. Typically, uprights and steering knuckles are made of cast iron or of lightweight alloy but there is potential for weight savings by manufacturing the knuckle/upright from a lightweight material such as fiber-reinforced polymer.

However, a problem there exists in joining the wheel bearing to the composite material of the upright/knuckle.

According to US2016121927A1 a whole steering knuckle composite body comprising a fiber-reinforced polymeric material is overmolded onto a sleeve element acting as a bearing connection interface and consisting of the outer ring of the rolling bearing unit constituting the wheel hub, or of a metal ring designed to be connected with the rolling bearing.

The fiber-reinforced material comprises a long-fiber molding compound that is overmolded to a first joining surface on the sleeve element, whereby the first joining surface is a radially outer surface of the sleeve element. In addition, the first joining surface is provided with a recessed portion into which the long-fiber molding compound flows, for mechanically locking the sleeve element to the composite body in an axial direction.

However, to mold a whole knuckle body (or a whole suspension upright) onto a rolling bearing, or anyway even onto a connection interface consisting of a metal sleeve, may be not a simple and cheap operation. Moreover, the transmission of forces between the bearing and the knuckle body may be not always optimized, in particular during cornering.

BRIEF SUMMARY OF THE INVENTION

The object of the present invention is to provide a hub bearing module for a suspension upright or knuckle, in particular a steering knuckle, of a vehicle, including a hub bearing unit, which is easy to be assembled to a composite material knuckle body and always ensures an optimized transmission of forces between the hub bearing unit and the knuckle body.

According to the invention, a hub bearing module for a suspension upright or knuckle of a vehicle is therefore provided having the features described in the appended claims.

BRIEF DESCRIPTION OF THE SEVERAL VIEWS OF THE DRAWING

The invention will now be described with reference to the accompanying drawings, which illustrate non-limiting embodiments thereof, in which:

FIG. 1 schematically illustrates in elevation a hub bearing module according to the invention, including a rolling bearing and assembled on an upright or knuckle of a vehicle suspension, represented in a sectional view taken along a plane parallel to a diametric plane of the rolling bearing, in this case defining a hub bearing unit integrated to the hub bearing module;

FIG. 2 illustrates in a schematic way a magnified sectional view of a detail of the hub bearing module of FIG. 1; and FIGS. 3a-3f illustrate schematically axonometric and sectional views, respectively, of different and non-limiting embodiments of one same component of the hub bearing module of FIG. 1.

DETAILED DESCRIPTION OF THE INVENTION

Figure 3F:
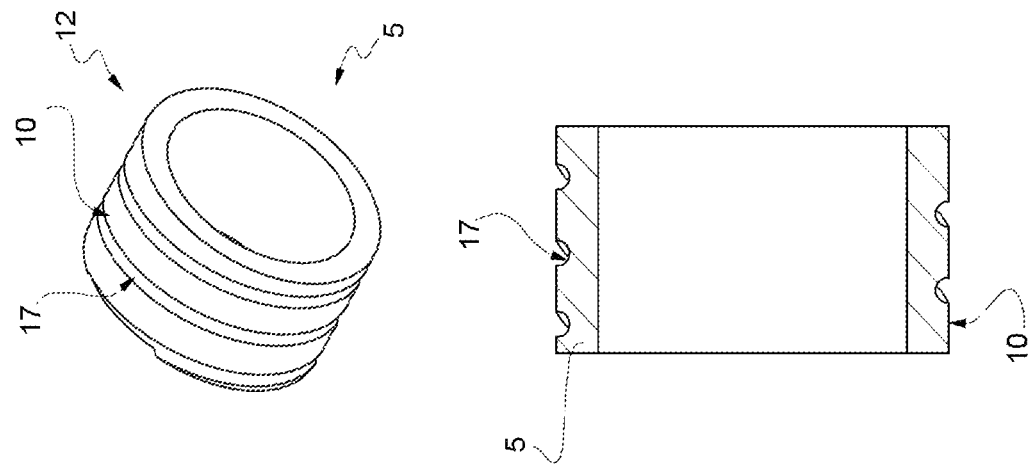

With reference to FIGS. 1 to 3, the number 1 indicates as a whole a wheel hub bearing module for a lightweight suspension upright or knuckle 2 of a vehicle, the latter being not shown for sake of simplicity.

The lightweight suspension upright or knuckle 2 is represented in a schematic, non-limitative manner only and may be made in any known manner, e.g. from sheared sheet metal or in a composite material, e.g. as that one shown in US2016121927A1 or by any other suitable method. It may be a steering knuckle for the front wheels of a vehicle or a rear upright or knuckle, indifferently.

The wheel hub bearing module 1 for the suspension upright or knuckle 2 comprises a wheel bearing 3 and a bearing connection interface 4 for connecting the wheel bearing 3 to the suspension upright or knuckle 2.

The bearing connection interface 4 is arranged generally coaxial with the wheel bearing 3 and includes a first sleeve element 5.

The wheel bearing 3 is in the non-limiting example shown a rolling bearing and preferably consists of a hub bearing unit having a known general layout, which therefore will not be described in detail.

According to one aspect of the invention, the bearing connection interface 4 also comprises a second sleeve element 6 arranged radially outside the first sleeve element 5 and comprising an annular body 7 coaxial with both the first sleeve element 5 and the wheel bearing 3. The annular body 7 has a radially outer lateral surface 8 and a radially inner lateral surface 9 and, according to a preferred embodiment of the invention, is made of a composite material selected from the group consisting of BMC (Bulk Molding Compound), LFT (Long Fiber Thermoplastic) and DLFT (Direct Long Fiber Thermoplastic).

BMC, as well as LFT/DLFT, are synthetic plastic materials in which individual reinforcing fibers of considerable length (usually ½ inch or 12 mm) are uniformly dispersed within a synthetic plastic matrix without a specific orientation (or oriented by the flow during the compression but never arranged in layers) while, e.g., in SMC materials the fibers are disposed in layers. In BMC materials the synthetic plastic matrix is generally formed by a thermosetting resin (but recently also by thermoplastic resin) and such materials are adapted to be formed, generally, by compression molding; in LFT/DLFT materials the synthetic plastic matrix is formed by a thermoplastic resin and such materials are adapted to be formed by injection molding. Moreover, in both the BMC and LFT materials the reinforcing fibers are of uniform length.

Preferably, in the final, molded material the individual reinforcing fibers form groups of fibers aligned with respect to each other, and the groups are uniformly dispersed randomly in the matrix, in order to give rise to an isotropic or nearly isotropic material.

Accordingly, it is an important aspect of the invention that the annular body 7 is made of any composite material including reinforcing fibers dispersed in a polymer matrix, wherein the individual reinforcing fibers form groups of fibers aligned with respect to each other, and the groups are uniformly dispersed randomly in the polymer matrix. The specific materials as set forth above are example of preferred materials falling within the above definition. It is intended however that any other composite material falling within the above definition may be advantageously used in the present invention.

According to one aspect of the invention, the radially inner lateral surface 9 is mechanically coupled, as it will be seen, to the first sleeve element 5 and the radially outer lateral surface 8 is configured to mechanically and chemically couple in use, as it will be seen, with the suspension upright or knuckle 2.

According to one aspect of the invention, in fact, the BMC/LFT/DLFT annular body 7 is preferably only partially cured and has been over-molded upon a radially outer lateral surface 10 of the first sleeve element 5.

The radially outer lateral surface 10 of the first sleeve element 5 is essentially cylindrical and develops in length (i.e. axially with respect to the sleeve element 5) along a first axis of symmetry A thereof.

The axis of symmetry A is also the axis of symmetry of the wheel bearing 3 and, in general terms, of the whole connection interface 4.

According to one aspect of the invention, the radially outer lateral surface 10 is not smooth, since it has been treated to increase adhesion to the BMC/LFT/DLFT annular body 7.

According to a preferred aspect of the invention, the radially outer lateral surface 10 of the first sleeve element 5 has been knurled or lettered or otherwise machined using mechanical, chemical or optical processes, such as to create thereon a surface texture 11 (FIG. 3a) that increases its surface area and/or creates any kind of microscopic interlocking features. Therefore, according to a preferred aspect of the invention, the outer lateral surface 10 of the first sleeve element 5 is provided, in a continuous or discontinuous manner, of a surface texture 11 that increases its surface area.

According to an aspect of the invention, the radially outer lateral surface 10 of the first sleeve element 5 is provided with locking means 12 embedded in the BMC/LFT/DLFT annular body (FIG. 2).

According to a preferred aspect of the invention, the radially outer lateral surface 10 of the first sleeve element 5 is simultaneously provided with both the locking means 12 and the surface texture 11.

The locking means 12 are selected from a group of equally possible different embodiments thereof, shown in figures from 3b to 3f FIGS. 3b to 3f are not limitative and further different embodiments of the locking means 12 may be possible.

According to a first embodiment shown in FIG. 3c, the locking means 12 consist in at least two annular grooves 13 having a circular shape, so coaxial with axis A, and provided axially spaced apart on the outer lateral surface 10 of the first sleeve element 5. The grooves 13 are entirely filled with the material of the BMC/LFT/DLFT annular body 7.

According to a second embodiment shown in FIG. 3b, the locking means 12 consist in at least two annular grooves 14 having a sinusoidal shape when seen in a plane parallel to axis A; the two grooves 14 are provided on the outer lateral surface 10 of the first sleeve element 5 at an axial distance there between such that they intersect to each other, as it can be clearly seen in FIG. 3b. Preferably, the two grooves 14 are shaped reciprocally symmetric, so that all the points of intersection thereof are aligned along a circumference 15 contained in a medial plane of the sleeve element 5 transversally perpendicular to axis A. The grooves 14 are entirely filled with the material of the BMC/LFT/DLFT annular body 7.

Figure 3E:
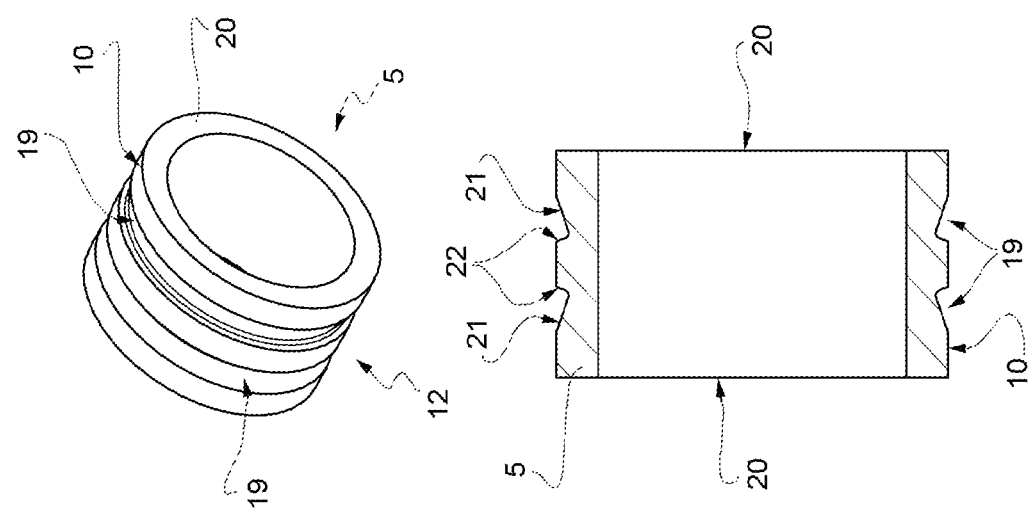
Figure 3D:
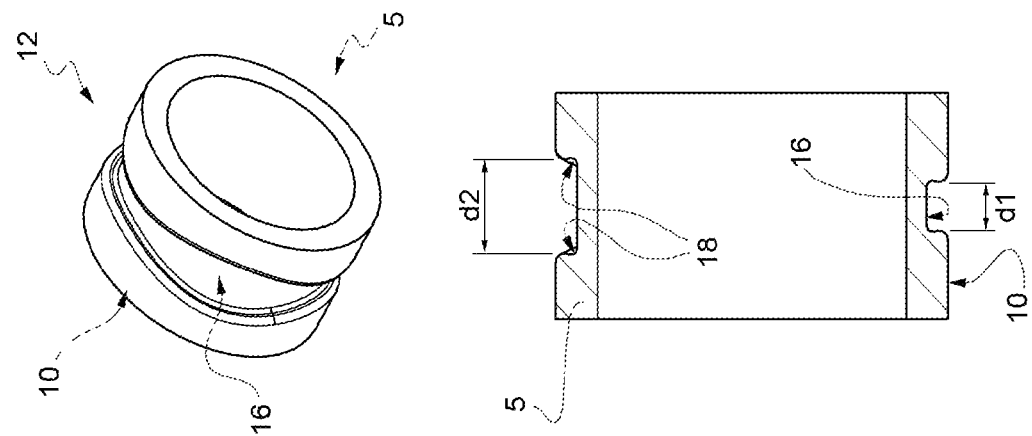

According to a third embodiment shown in FIG. 3d, the locking means 12 consist in at least one annular groove 16 provided on the outer lateral surface 10 of the first sleeve element 5. The annular groove 16 has a circular shape with non-constant cross section.

In particular, an axial width (i.e. the width of groove 16 measured along axis A) of the annular groove 16 progressively and alternately widens and narrows along a tangential development of the annular groove 16 itself around axis A. As an example, the axial width of the groove 16 varies continuously and every 90° moving around axis A between a minimum width d1 and a maximum width d2.

The groove 16 is entirely filled with the material of the BMC/LFT/DLFT annular body 7.

According to a fourth embodiment shown in FIG. 3f, the locking means 12 consist in at least one non-circular, non-annular groove 17 provided on the outer lateral surface 10 of the first sleeve element 5 according to a helicoid path running around axis A and equidistant thereto. According to this embodiment, the first sleeve element 5 may be maneuvered like a screw within the BMC/LFT/DLFT annular body 7.

The groove 17 is entirely filled with the material of the annular body 7.

According to a fifth embodiment of the present invention, anyone of the previously described grooves 13, 14, 16 and 17 is formed (by means of conventional manufacturing processes such as forging, milling, turning or cold forming) such as to have/present a cross section (taken in a radial diametric plane crossing the sleeve element 5 and shown in FIG. 3d at the bottom) defining within the groove 13, 14, 16 or 17 undercuts 18 in a radial direction.

According to a sixth embodiment shown in FIG. 3e, the locking means 12 consist in at least two annular grooves 19 having a circular shape developing around axis A and provided axially spaced apart on the outer lateral surface 10 of the first sleeve element 5; the two grooves 19 are arranged adjacent, each, to one of two opposite ends 20 of the first sleeve element 5.

Each groove 19 is delimited in an axial direction by one first flank 21 defined by an inclined surface sloping radially outward toward the axial end 20 immediately adjacent thereto and by one second flank 22, arranged opposite the first flank 21 and delimited by a flat surface extending radially outwards and arranged substantially perpendicular to the first axis A of symmetry.

The grooves 19 are entirely filled with the material of the BMC/LFT/DLFT annular body 7.

According to the invention, therefore, the locking means 12 are selected from the group consisting in: at least two annular grooves 13 having a circular shape provided axially spaced apart on the outer lateral surface 10 of the first sleeve element 5; at least two annular grooves 14 having a sinusoidal shape provided on the outer lateral surface 10 of the first sleeve element 5 at an axial distance there between such that they intersect to each other; at least one annular groove 16 provided on the outer lateral surface 10 of the first sleeve element 5, the annular groove 16 having a circular shape with non-constant cross section, an axial width of the annular groove progressively and alternately widening and narrowing along a tangential development of the annular groove 16; at least one non-circular, non-annular groove 17 provided on the outer lateral surface 10 of the first sleeve element 5 according to an helicoid path; anyone of the above having a cross section defining within the groove undercuts 18 in a radial direction; at least two annular grooves 19 having a circular shape and provided axially spaced apart on the outer lateral surface 10 of the first sleeve element 5, each adjacent to a respective opposite end 20 of the first sleeve element 5, each groove 19 being delimited in an axial direction by one first flank 21 defined by an inclined surface sloping radially outward toward the axial end 20 immediately adjacent thereto and by one second flank 22, arranged opposite the first and delimited by a flat surface extending radially outwards and arranged substantially perpendicular to the first axis of symmetry A.

According to a preferred feature of the invention, the at least one groove 16, 17 or the grooves 13, 14, 19 has/have a radial depth comprised between 0.2 and 5 mm and preferably comprised between 1 and 2 mm.

In this manner, after manufacturing, the service load is transferred in use:

axially (meaning along a direction parallel to axis A), according to all the embodiments described, by the opposite flanks delimiting axially the grooves 13, 14, 16, 17, 19, which flanks produce a non-zero radial projection in the direction of axis A;

radially by all the surfaces which axial projection in radial direction is different from zero, in the case in point the undercuts 18 in any of the groove section;

tangentially by the force of friction and/or adhesion between the metallic sleeve element 5 and the material of the annular body 7, and by surfaces which produces a non-zero projection along the tangent direction, in the case in point constituted by respective opposite lateral walls or flanks of groove 16 of variable cross section or of grooves 14, 17 owing to the non-circular path/shape thereof, which is in fact sinusoidal for groove 14 and helicoid for groove 17.

Of course, the locking means 12 may be provided using a solution dual of those shown in FIGS. 3b-3f, namely by providing the surface 10 of reliefs/ribs instead of grooves, but having identical path, also in this case fully embedded in the material of the BMC/LFT/DLFT annular body 7.

Finally, in addition to or in place of the grooves 13, 14, 16, 17 and 19 (or of the corresponding reliefs/ribs) the locking means 12 may comprise also radial pins projecting from surface 10 and made integral with the first sleeve element 5.

According to a preferred aspect of the invention, the first sleeve element 5 is made of bearing grade steel; in this case, the wheel bearing 3 is a rolling bearing including an inner ring 23 and an outer ring consisting of the first sleeve element 5, arranged coaxially to each other.

According to a possible alternative embodiment, the wheel bearing 3 is an independent unit fitted inside the sleeve element 5, so as it can be easily removed in case of failure.

The same advantage may be reached, however, by the embodiment of FIG. 3f, where, after having obtained the wheel hub bearing module 1, the wheel bearing 3 may be removed in case of failure by unscrewing the sleeve element 5 from the BMC/LFT/DLFT annular body 7. Thereafter, a new bearing may be screwed into the BMC annular body 7 and bonded thereto.

According to a further aspect of the invention, the second sleeve element 6 of the connection interface 4 comprise a further interface element 24 (FIG. 1) arranged radially outside the BMC or LFT/DLFT annular body 7 and consisting of a mat or plies 25 of continuous reinforcing fibers embedded in a synthetic plastic matrix; the interface element 24 is bonded directly to the radially outer lateral surface 8 of the BMC/LFT/DLFT annular body 7 and is obtained thereon preferably in a partially cured form to then mechanically and chemically couple the annular body 7 with the suspension upright or knuckle 2 when both the annular body 7 and the interface element 24 are finally completely cured.

It is in fact important to underline that the connection interface 4, in particular the annular body 7 and the interface element 24 thereof, may be obtained either as a semi-finished, self-supporting product/unit to be then received in a suspension upright/knuckle which is possibly overmolded thereon if formed in a reinforced plastic material, or may be formed directly in a finished state together with the suspension upright/knuckle, especially when the latter is formed in a reinforced plastic material.

In the first case, either both the annular body 7 and the interface element 24 or the interface element 24 only are obtained in an only partially cured state, so as to be completely cured only during a subsequent step, in which they have been already assembled to the suspension upright/knuckle or in which the suspension upright/knuckle is obtained by over-molding having placed the semi-finished unit including the semi-cured body 7 and element 24 within the mold to form the suspension upright/knuckle. In the second case, on the contrary, the body 7 and element 24 are formed simultaneously to each other and with the suspension upright/knuckle in a same mold by co-molding, and are then obtained in a completely cured state, together with the suspension upright/knuckle.

In any case, according to an important feature of the invention, the fibers of the mat or plies 25 forming the interface element 24 are continuous and are of a length of the same overall dimension of the interface element 24 itself and are arranged in superimposed layers wherein each layer is formed by fibers of the same length unidirectionally oriented (except than in a mat, where the fibers are arranged in layers which are not generally unidirectional) according to a preferred direction chosen according to the needs so as to obtain the maximum mechanical property along the chosen preferred direction.

On the contrary, the fibers of the BMC/LFT/DLFT annular body 7 are oriented generally randomly, dispersed with random orientation in all the possible directions in a polymer matrix, eventually specifically oriented on purpose by mean of polymer process flow to achieve optimal performance according to local loading paths, but anyway so as to preferably obtain an isotropic distribution thereof and corresponding isotropic mechanical properties of the annular body 7.

The interface element 25 is preferably cylindrical but may be shaped in any manner suitable for adhesion to the upright or knuckle 2.

According to a further aspect of the invention, the BMC/LFT/DLFT annular body 7 and the mat or plies 25 are formed both by organic or inorganic fibers (e.g. glass fibers, aramid fibers, carbon fibers or mixtures thereof) embedded in a polymer matrix, with the proviso that the fibers in the annular body 7 are selected shorter than those in the mat or plies 25.

Preferably, the BMC/LFT/DLFT annular body 7 consists of 30-70% by volume of carbon fibers having an average length comprised between 10 mm and 50 mm dispersed with random orientation in a polymer matrix.

Preferably, the carbon fibers have an average diameter of about 7 microns.

The polymer matrix may be optionally added with a filler.

Any available filler compatible with the carbon fibers and with the polymer matrix is suitable.

The polymer matrix is preferably formed by a plastic resin selected from the group consisting in: epoxy, PA6 (polyamide 6), PA66, PA11, PA12, polyphenylene sulfide, PEEK, PAEK, PEKK, any mixture of the above.

It has been surprisingly found that providing more than one recess on the outer surface of the metallic sleeve element 5 and above all providing a combination of locking means and of surface texture on the surface 10 and specifically one or more of the shapes described, allows the loads to be transferred smoothly from the wheel bearing 3 to the upright/knuckle 2 and vice versa without overloading the polymer matrix of the annular body 7.

Also the combination of an annular body 7 made of BMC/LFT/DLFT with an outer interface element made of a mat or plies 25 of longer and unidirectionally oriented fibers allows surprisingly the loads to be transferred smoothly from the wheel bearing 3 to the upright/knuckle 2 and vice versa without overloading the second sleeve element 6.

Also, the proper selection of the materials and of the length of the fibers allows to better reach such goal.

All the objects of the invention are therefore achieved.

What is claimed is:

1. A hub bearing module for a suspension upright or knuckle of a vehicle, the hub bearing module comprising:
   a wheel bearing; and
   a bearing connection interface arranged coaxial with the wheel bearing and configured to connect the wheel bearing to the suspension upright or knuckle, the bearing connection comprising:
   a first sleeve element; and
   a second sleeve element arranged radially outside the first sleeve element, the second sleeve comprising:
      an annular body having a radially outer lateral surface mechanically coupled to the first sleeve element;
      a radially inner lateral surface made of a composite material comprising reinforcing fibers dispersed in a polymer matrix,
      wherein the individual reinforcing fibers form groups of fibers aligned with respect to each other, the groups uniformly dispersed randomly in the polymer matrix; and
         an interface element bonded to the radially outer lateral surface of the annular body and comprising a mat or plies of continuous fibers embedded in a partially cured polymer matrix, wherein the fibers of the mat or plies have a length equal to a length of the interface element and are arranged in a plurality of superimposed layers,
      wherein the radially outer lateral surface being configured to mechanically and chemically couple with the suspension upright or knuckle.

2. The hub bearing module according to claim 1, wherein the composite annular body is partially cured and has been overmolded upon an outer lateral surface of the first sleeve element, the outer lateral surface of the first sleeve element being cylindrical, extending along a first axis of symmetry (A) thereof and being treated to increase adhesion to the composite annular body.

3. The hub bearing module according to claim 2, wherein the outer lateral surface of the first sleeve element has been mechanically or chemically worked, creating a surface texture that increases a surface area of the outer lateral surface.

4. The hub bearing module of claim 3, wherein the outer lateral surface of the first lateral sleeve is mechanically or chemically worked by knurling or lettering.

5. The hub bearing module according to claim 2, wherein the outer lateral surface of the first sleeve element is further provided with locking means embedded in the composite annular body.

6. The hub bearing module according to claim 5, wherein the locking means are selected from the group consisting of:
   at least two annular grooves having a circular shape provided axially spaced apart on the outer lateral surface of the first sleeve element;
   at least two annular grooves having a sinusoidal shape provided on the outer lateral surface of the first sleeve element at an axial distance there between such that they intersect to each other;
   at least one annular groove provided on the outer lateral surface of the first sleeve element, the annular groove having a circular shape with non-constant cross section, an axial width of the annular groove progressively and alternately widening and narrowing along a tangential development of the annular groove;
   at least one non-circular, non-annular groove provided on the outer lateral surface of the first sleeve element according to an helicoid path;
   and
   at least two annular grooves having a circular shape and provided axially spaced apart on the outer lateral surface of the first sleeve element, each adjacent to a respective opposite end of the first sleeve element, each groove being delimited in an axial direction by one first flank defined by an inclined surface sloping radially outward toward the axial end immediately adjacent thereto and by one second flank, arranged opposite the first and delimited by a flat surface extending radially outwards and arranged substantially perpendicular to the first axis of symmetry.

7. The hub bearing module according to claim 6, wherein the at least one groove has a radial depth comprised between 0.2 and 5 mm and preferably comprised between 1 and 2 mm.

8. The hub bearing module according to claim 6, wherein the locking means comprises a radial cross section defining one or more radially extending undercuts in the groove.

9. The hub bearing module according to claim 1, wherein the wheel bearing further comprises:
   an outer ring comprising the first sleeve element and
   an inner ring arranged coaxial with the outer ring,
   wherein the first sleeve element is made of bearing grade steel.

10. The hub bearing module according to claim 1, wherein the composite annular body and the mat or plies are formed by organic or inorganic fibers embedded in a polymer matrix, the fibers in the BJVIC/LFT/DLFT annular body configured to be shorter than those in the mat or plies.

11. The hub bearing module according to claim 10, wherein the composite annular body consists of 30-70% by volume of carbon fibers having an average length comprised between 10 mm and 50 mm dispersed in a polymer matrix, the polymer matrix added with a filler and formed by a resin selected from the group consisting in: epoxy, PA6 (polyamide 6), PA66, PA11, PA12, polyphenylene sulfide, PEEK, PAEK, PEKK, or any 20 mixture of the above.

12. The hub bearing module of claim 1, wherein the composite material is selected from a group consisting of BMC (Bulk Molding Compound), LFT (Long Fiber Thermoplastic) and DLFT (Direct Long Fiber Thermoplastic).

* * * * *